US008561184B1

(12) United States Patent
Marsa et al.

(10) Patent No.: US 8,561,184 B1
(45) Date of Patent: *Oct. 15, 2013

(54) SYSTEM, METHOD AND COMPUTER PROGRAM PRODUCT FOR COMPREHENSIVE COLLUSION DETECTION AND NETWORK TRAFFIC QUALITY PREDICTION

(75) Inventors: Robert Lee Marsa, Round Rock, TX (US); Srinivas Rao Doddi, Fremont, CA (US)

(73) Assignee: Adometry, Inc., Austin, TX (US)

( * ) Notice: Subject to any disclaimer, the term of this patent is extended or adjusted under 35 U.S.C. 154(b) by 671 days.

This patent is subject to a terminal disclaimer.

(21) Appl. No.: 12/797,904

(22) Filed: Jun. 10, 2010

Related U.S. Application Data

(63) Continuation-in-part of application No. 12/700,053, filed on Feb. 4, 2010.

(51) Int. Cl.
*G06F 21/22* (2006.01)

(52) U.S. Cl.
USPC .............................................. 726/22; 726/26

(58) Field of Classification Search
USPC ......................................................... 726/22
See application file for complete search history.

(56) References Cited

U.S. PATENT DOCUMENTS

| | | | |
|---|---|---|---|
| 6,381,628 | B1 | 4/2002 | Hunt |
| 6,714,975 | B1 | 3/2004 | Aggarwal et al. |
| 7,657,626 | B1 | 2/2010 | Zwicky |
| 8,015,190 | B1 | 9/2011 | Bayardo et al. |
| 8,190,592 | B1 | 5/2012 | Bayardo et al. |
| 2006/0212350 | A1* | 9/2006 | Ellis et al. ................... 705/14 |
| 2008/0243637 | A1 | 10/2008 | Chan et al. |
| 2008/0270154 | A1* | 10/2008 | Klots et al. ................... 705/1 |
| 2009/0157417 | A1* | 6/2009 | Bradley et al. ................ 705/1 |
| 2009/0299967 | A1 | 12/2009 | Li et al. |

OTHER PUBLICATIONS

Metwally et al. Pub IEEE 2007—On Hit Inflation Techniques and Detection in Streams of Web Advertising Networks.*
Conrad et al.—University of Heinrich-Heine Pub 2008—Partitioning Massive Graphs for Content Oriented Social Network Analysis.*
Abramson, Craig and Kistler, Kenny, "Managing Click-Stream Data," Syncsort Incorporated, Woodcliff Lake, NJ, printed on Jan. 14, 2010 from URL://http://www.syncsort.com, 16 pgs.
Office Action for U.S. Appl. No. 12/700,053, mailed May 22, 2012, 15 pgs.

(Continued)

*Primary Examiner* — Jung Kim
*Assistant Examiner* — Tri Tran
(74) *Attorney, Agent, or Firm* — Sprinkle IP Law Group

(57) ABSTRACT

Embodiments disclosed herein seamlessly integrate several components into a comprehensive collusion detection and traffic quality prediction system, including a strong modeling module for processing historical click data and transforming potential collusions hidden therein into solvable graph partitioning (network) and/or vector space clustering (pattern) models, a scalable and robust toolkit comprising a plurality of graph partitioning and clustering heuristics for analyzing and generating high density subgraphs and high dimensional clusters or groups, and a post processing module for extracting entities from the subgraphs and clusters and placing them on global block lists. Entities thus listed can be blocked from client networks in real time. As such, high traffic quality can be predicted. A job scheduler may schedule individual jobs from the modeling module based on the number of available resources in a distributed computing environment to minimize completion time while balancing load.

20 Claims, 10 Drawing Sheets

(56) References Cited

OTHER PUBLICATIONS

Kantardzic, Mehmed et al., Collaborative Click Fraud Detection and Prevention System (CCFDP) Improves Monitoring of Software-Based Click Fraud, University of Louisville Publication 2005, ISBN No. 972-8924-06-2, pp. 34-41.

Kantardzic, Mehmed et al., Improving Click Fraud Detection by Real Time Data Fusion, 2008, IEEE Publication No. 978-1-4244-3555-5/08, pp. 69-74.

Notice of Allowance for U.S. Appl. No. 12/700,053, mailed Jan. 30, 2013, 8 pgs.

Notice of Allowance for U.S. Appl. No. 12/700,053, mailed May 8, 2013, 8 pgs.

\* cited by examiner

SYSTEM, METHOD AND COMPUTER PROGRAM PRODUCT FOR COMPREHENSIVE COLLUSION DETECTION AND NETWORK TRAFFIC QUALITY PREDICTION

CROSS-REFERENCE TO RELATED APPLICATION(S)

This is a continuation-in-part of U.S. patent application Ser. No. 12/700,053, filed Feb. 4, 2010, entitled "SYSTEM, METHOD AND COMPUTER PROGRAM PRODUCT FOR COLLUSION DETECTION," which is incorporated herein by reference as if set forth in full.

TECHNICAL FIELD OF THE DISCLOSURE

The present disclosure relates generally to network traffic quality. More particularly, the present disclosure relates to a system, method, and computer program product for comprehensive collusion detection and network traffic quality prediction.

BACKGROUND OF THE DISCLOSURE

Pay per click advertising is an arrangement in which operators of Web sites, acting as publishers, display clickable links from advertisers in exchange for a charge per click. Cost per click (CPC) advertising is a growing part of the online advertising market. Advertisers using the CPC model pay for each ad click. If the ad clicks are fraudulent, they can lose a substantial amount of money.

Recently, click fraud detection has become a growing concern. It is becoming an increasing problem due to the fact that people committing click fraud can make large sums of money. Every day, fraudsters are coming up with innovative schemes to monetize it.

Click fraud can occur in various ways and can be broadly classified into two types: 1) publisher fraud and 2) competitor fraud. Publisher fraud is when an online publisher or someone associated with the publisher generates as many clicks as possible on a Web site operated by the publisher. This is motivated by the fact that the publisher gets paid each time someone clicks on an ad, whether that click is valid or not. Competitor fraud is not motivated by making money on the clicks but rather in making the competitor pay for clicks that are useless to them. Clicking on a competitor's ads can cause their budget to be exhausted so there are no ads left to serve to legitimate users.

Although the incentives in both types of click fraud may be different, the underlying techniques employed to commit fraud are very similar. Intuitively, fraudsters distribute their traffic to multiple entities to mimic normal traffic and thus evade fraud detection. This type of activity is known as collusion. Either type of fraud may enlist the aid of botnets or click farms to generate clicks, i.e., to click on paid search ads. A botnet or robot network is a group of computers running a computer application—a software robot—controlled and manipulated by the owner or the software source. Botnets can be programmed to run autonomously and automatically to click on online ads. In the case of click farms, humans are enlisted to click on ads.

Detecting collusion fraud is much more difficult than detecting click fraud by a single entity for several reasons. The fraudulent clicks may be spread across dozens or hundreds of sites and may be generated from numerous different IP addresses, making any possible detection computationally expensive and time consuming.

In general, application of ad hoc techniques is not practical as fraudsters constantly change their ways, which also makes accurately predicting network traffic quality a nearly impossible task. Accordingly, there is a need for a comprehensive system and method for click fraud detection and network traffic prediction. The present disclosure can address this need and more.

SUMMARY OF THE DISCLOSURE

Embodiments disclosed herein provide a collusion detection and traffic quality prediction system that combines various components together in a novel way to detect and block bad traffic in real time and improve traffic quality. Embodiments disclosed herein can be distributed, modular, extensible, scalable, and useful for servicing a large number of high volume clients, offering a complete, comprehensive solution to click fraud detection and network traffic quality prediction.

The sophisticated and scalable online fraud detection techniques disclosed herein can be easily extended or otherwise adapted to detect various types of collusion fraud. One technique disclosed herein focuses on detecting collusion involving various types of publisher fraud and competitor fraud. The term "collusion" refers to an organized activity in which groups of visitors click on groups of ads. Examples may include, but are not limited to: botnets, a group of referrers or publishers involved in a scheme, auto-clicking, clicking on competitors' sites, etc.

In some embodiments, a collusion detection and traffic quality prediction system may comprise the following main components.

A Modeling Module

Computationally, collusion detection may involve exploring a large number of subgroups.

To address this issue, this highly flexible and easily extendable modeling module is operable to model the detection of collusion and prediction of traffic quality (TQ) as graph (network) partitioning and vector space (pattern) clustering problems. Modeling various types of click fraud as clustering in networks (or graphs) or clustering in high dimensional vector spaces allows embodiments disclosed herein to be useful in capturing many types of fraud, making this a versatile and practical solution.

Examples disclosed herein show how to model various types of collusion in the frameworks of a network analysis or a vector space analysis. Specifically, examples disclosed herein show:

1. How to construct representations that preserve important information relevant to click fraud: (i) graphs or networks and (ii) vectors (arrays of real numbers) that capture the right information necessary for various types of fraud.
2. How to model the detection of collusion in publisher fraud and competitor fraud as clustering problems, including the detection of botnets or click farms.
3. Type of clustering methods that are highly efficient and scalable for detecting collusion.

Graphs and vectors are abstract mathematical objects. Analyzing these objects amounts to identifying groups of entities that are related to each other. The modeling module models these relationships as the edges in graphs or some metrics (e.g., Euclidean) in vectors. Since these objects are highly generic, they can be used to represent a wide range of collusion detection problems and TQ prediction issues. Some examples may include, but are not limited to:

1. High dense subgraphs of networks between IPs and publishers can be used to represent IP to publisher collusion.
2. High dense subgraphs of IP to IP network where nodes are IPs and edges correspond to two IPs having shared keywords, shared publishers or clicking times, etc. may correspond to potential collusions.
3. Clusters of vectors where each vector corresponds to time series of publishers or referrer domains, etc. may represent potential collusions or time programmed botnets.

As an example, the modeling module can model the detection of collusion between a subset of IPs (i.e., IP addresses associated with human or non-human clickers) and a subset of referrers (i.e., domain based addresses where the clickers visited prior to reaching a destination such as a Web page or file in a publisher's domain) as finding high dense subgraphs in a bipartite graph where each the weight of each edge is the number of clicks from an IP to a referrer.

Modeling the collusion detection problem as a clustering problem on networks or vector spaces can provide many advantages, including generality, flexibility and simplicity to click fraud detection. For example, the modeling module can address many types of click fraud detection problems and operate in a plug-and-play environment. Moreover, the modeling module can simultaneously construct several graphs or several sets of vectors, each representing a different piece of information. Different patterns can then be extracted from the graphs or vectors thus constructed. The modeling module may include a filtering feature or function for eliminating IPs with fewer than a predetermined threshold on the number of clicks.

A Toolkit

To solve the problems (i.e., the results) from the modeling module, the system integrates a toolkit comprising various highly scalable and highly accurate graph partitioning/clustering (network analysis) and high dimensional vector space clustering (pattern analysis) methods, also referred to herein as heuristics or algorithms. Some of the network analysis techniques may include graph partitioning or graph clustering. The toolkit is highly optimized to take advantage of the underlying properties of the data. For example, the networks (or graphs) generated by the modeling module can include groups of highly dense connected nodes sparsely connected to each other. Since many of the underlying graphs are sparse, some embodiments of the toolkit may include sparse graph partitioning algorithms.

In embodiments disclosed herein, clustering can provide highly accurate results, minimizing false positives and false negatives. Clustering in general is known to be computationally difficult to solve. We noticed that the networks corresponding to end users, online publishers, online referrers, etc. have special properties: they are very similar to social networks. We also recognized that vector space representations can offer powerful tools to analyze data. To reduce the computational cost of clustering, some embodiments disclosed herein integrate highly accurate, efficient, and scalable heuristics, including heuristics developed for social networks as well as heuristics developed for general clustering methods. For example, dimensionality reduction techniques such as principal component analysis (PCA) and singular value decomposition (SVD) may be utilized to reduce the dimensions and increase the speed, thus improving the run of clustering.

All the algorithms of the toolkit may take advantage of the underlying characteristics of the networks and vectors and are designed to be input/output (I/O) efficient. The toolkit utilizes input/output formats that are well defined for easy extensibility. In some cases, several types of analysis can be performed on each client at the same time. Thus, in some embodiments, the toolkit may run in a distributed environment with job scheduling mechanisms that optimize the running time.

A Post Processor Module

Using various additional parameters, the post processor component may generate lists of entities such as IPs, cookie IDs, user IDs, publishers, subpublishers (referrers), keywords, etc. that are involved in collusion or low quality traffic. In some embodiments, this component is configurable for each client. In some embodiments, the global block lists may be updated continuously with the new lists coming from individual clients. In some embodiments, entities on these lists may be blocked from entering an individual client's domain or from reaching a destination in the client's domain. In some embodiments, entities on these lists may be blocked globally across multiple clients. In some embodiments, a real time traffic scoring engine may have access to the latest global block lists and may utilize the global block lists to score, in real time, incoming click data.

A Job Scheduler

Some embodiments disclosed here may be implemented in a distributed computing environment comprising various clusters of computers. In some embodiments, a job scheduler may schedule individual jobs to be performed by these computers based on the job sizes and the number available jobs. The job scheduler is operable to minimize or otherwise optimize the job completion time while balancing the load based on CPU speed and main memory of these distributed computers. Currently, the system is rapidly growing with an increasing number of clients, each having a very large amount (e.g., several millions of clicks in a week) of traffic. Processing such a large number of clients with high volume traffic requires a solid distributed environment. As the number of clients reaching from hundreds to thousands, the job scheduler can play a significant role in scaling.

Embodiments disclosed herein can provide many advantages. For example, modeling collusion detection and TQ prediction as graph partitioning and high dimensional clustering problems provides a more robust, flexible, scalable, efficient, and accurate solution over ad hoc methods. The toolkit includes a wide range of heuristics: from highly accurate (but not necessarily scalable) to highly scalable (but not necessarily accurate). The system can be easily configured to choose a particular heuristic (from a suite of heuristics) depending on the type of client and their traffic distributions. The post processor can generate or modify global block lists in near real time, enabling the system to have real time impact on improving a client's traffic quality. The system can be distributed to take advantage of the processing power and resources of multiple CPUs (both homogeneous and heterogeneous). The job scheduler module can address the fast growth and enhance the scalability of the overall system. Each system component can be configured to run in a plug-and-play environment, which makes the system easily extensible. For example, updating the system to detect a new type of collusion may be as easy as adding a new heuristic or algorithm. In some embodiments, the concept of vector spaces can be generalized to create signatures of various entities (multidimensional). These signatures can be monitored to see changing trends, enabling the system to continuously detect click fraud.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
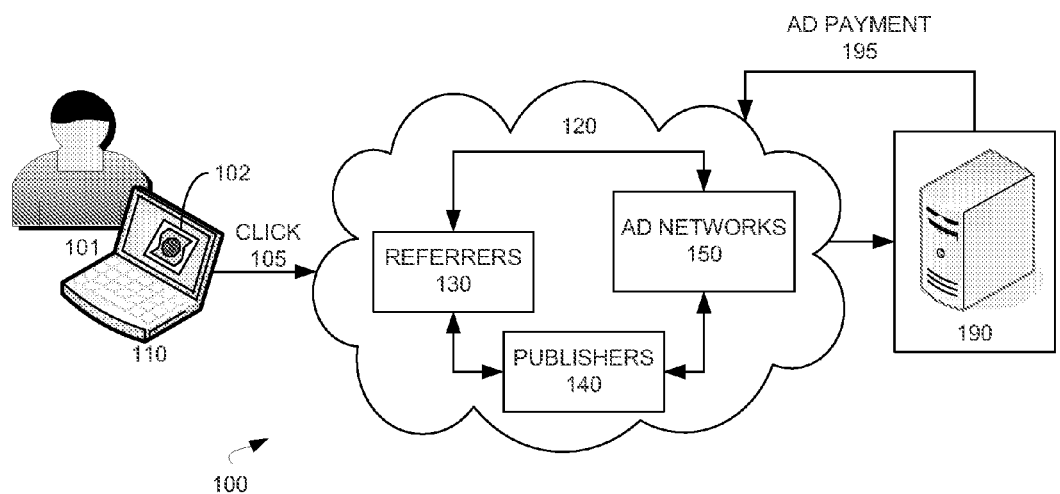
FIG. 1 depicts a diagrammatic representation of an example click transaction in a network environment.

The disclosure and the various features and advantageous details thereof are explained more fully with reference to the non-limiting embodiments that are illustrated in the accompanying drawings and detailed in the following description. Descriptions of well known hardware and software components, programming languages and programming techniques are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

FIG. 1 is a diagrammatic representation of an example click transaction in a network environment. The beginning of the chain is IP (user) and the end of the chain is an advertiser. All the remaining entities make money, except advertisers who pay for their ads. In this example, click transaction 100 may begin with user 101 clicking on online ad 102 via user device 110 at a particular Internet Protocol (IP) address and may end with advertiser 190 paying for that click via ad payment 195. Intermediaries 120 such as referrers 130, publishers and sub-publishers 140, and Ad networks 150 may make money from click 105—by charging a fee and/or sharing ad payment 195 for ad 102. For example, user 101 may visit a popular Internet search portal or Web site that is operated by referrer 130. Ad 102 may be a clickable link displayed on a Web page in the domain owned by referrer 130. Clicking on ad 102 may redirect a browser application running on user device 110 to an URL referencing a Web page published by publisher 140. Publisher 140 may be in Ad network 150, of which advertiser 190 may also be a member. The publisher's Web page residing at the particular URL may contain promotional information on a product mentioned in ad 102. Various techniques exist to track the identity of user 101. For example, in addition to redirecting the user's browser application to a publisher's server, a referrer's server may also send the publisher's server timestamps, cookies, user agents, or other information from user device 110 and/or user 101.

Broadly speaking, there are two types of click fraud: (1) publisher fraud and (2) competitor fraud. Collusion is a generic approach to commit these two types of fraud. If a fraudulent action involves a single IP address, referrer, publisher, or Ad network, it might not be difficult to catch as this single IP address, referrer, publisher, or Ad network can be readily identified by examining the amount of traffic involving the same IP address, referrer, publisher, or Ad network— which is abnormally high. It can be much harder to detect fraud when it is committed by multiple entities such as a group of referrers, a group of users with different IP addresses, or a mixture of users, referrers, etc. From a computational point of view, this results in an exponential search space, since a very large number of subsets would need to be enumerated.

In addition to collusion detection, traffic quality (TQ) prediction is an important issue for Ad networks, since they use this information to optimize their traffic to maximize the profits. The current methodology of TQ prediction looks at each click independent of other clicks. However, each click may look very normal.

Figure 2:
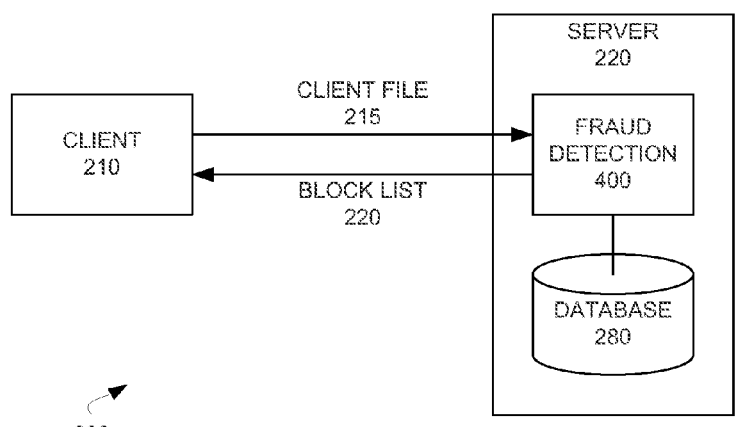
FIG. 2 depicts a diagrammatic representation of an example network architecture comprising a client and an embodiment of a collusion detection system.

FIG. 2 depicts a diagrammatic representation of an example network architecture comprising a client and an embodiment of a collusion detection system. Architecture 200 may comprise client site 210 and server site 220. Server site 220 may represent a computing environment comprising one or more server machines. Each server machine may include a central processing unit (CPU), read-only memory (ROM), random access memory (RAM), hard drive (HD) or non-volatile memory, and input/output (I/O) device(s). An I/O device may be a keyboard, monitor, printer, electronic pointing device (e.g., mouse, trackball, etc.), or the like. The hardware configuration of this server machine can be representative to other devices and computers alike at server site 220 as well as client site 210.

For the sake of simplicity, hardware components (e.g., CPU, ROM, RAM, HD, I/O, etc.) are not illustrated in FIG. 2. Embodiments disclosed herein may be implemented in suitable software code (i.e., computer instructions translatable by a processor). As one skilled in the art can appreciate, computer instructions and data implementing embodiments disclosed herein may be carried on various types of computer-readable storage media, including volatile and non-volatile computer memories and storage devices. Examples of computer-readable storage media may include ROM, RAM, HD, direct access storage device arrays, magnetic tapes, floppy diskettes, optical storage devices, etc. In an illustrative embodiment, the computer instructions may be written in Java® or any appropriate computer language. In embodiments disclosed herein, some or all of the software components may reside on a single server computer or on any combination of separate server computers. Communications between any of the computers described above may be accomplished in various ways, including wired and wireless. As one skilled in the art can appreciate, network communications can include electronic signals, optical signals, radio-frequency signals, and other signals as well as combinations thereof.

In some embodiments, a method for modeling collusion detection may be implemented at a server computer in an enterprise computing environment. Embodiments disclosed herein include a system and a computer program product implementing the method. In some embodiments, the method may comprise receiving historical click data from a client computer connected to the enterprise computing environment over a network. In some embodiments, the historical click data may comprise a plurality of clicks generated over a period of time and information associated with the plurality of clicks.

In some embodiments, the historical click data may be collected by the client computer. In some embodiments, the client computer may be a server machine residing at the client site, in the client's computing environment or network. In some embodiments, the client computer may collect click streams associated with visitors to one or more Web sites owned and/or operated by the client. The collected information may be stored in one or more log files. In some embodiments, the client's one or more log files may contain the historical click data. In some embodiments, the information associated with the plurality of clicks may comprise visitor Internet Protocol (IP) address information, date and time information, publisher information, referrer information, user-agent information, searched keywords, cookie, and so on.

In some embodiments, software running on a server computer may extract entities from the historical click data. In some embodiments, the extracted entities are utilized to formulate potential collusion among the entities as a network problem, a vector space problem, or a combination thereof.

In this simplified example, architecture 200 may comprise a computer program product having one or more computer readable storage media storing computer instructions translatable by a processor to perform an embodiment of fraud detection 400. In some embodiments, server site 220 and client site 210 may represent enterprise computing environments owned and operated by different entities. For example, company A at server site 220 may provide click fraud detection services to company B at client site 210. In one embodiment, these entities may communicate over a network. In one embodiment, these entities may communicate over a secure channel in a public network such as the Internet.

Fraud detection software 400 running on one or more server machines (referred to herein as fraud detection system 400) at server site 220 may receive client file 215 from client site 210. As a specific example, the client may be an online retailer and may collect click stream data from visitors to a Web site own and/or operated by the online retailer. In some embodiments, client file 215 may be a Web log file or a file containing historical click data that can provide a detailed look at how each visitor got to the Web site, what pages were viewed by the visitor, what products and/or services the visitor clicked on, the date and time of each visit and click, and so on. The specific click stream data that can be collected from each click stream may include a variety of entities such as the Internet Protocol (IP) address associated with a visitor (which can be a human or a bot), timestamps indicating the date and time at which each request is made or click is generated, target URL or page and network address of a server associated therewith, user-agent (which shows what browser the visitor was using), query strings (which may include keywords searched by the visitor), and cookie data. For example, if the visitor found the Web site through a search engine, the corresponding click stream would generally contain the referrer page of the search engine and the search words entered by the visitor. Click stream data is generally created using a corporate information infrastructure that supports a Web-based enterprise computing environment. A skilled artisan can appreciate what typical click streams may contain and how they are generated and stored. Embodiments disclosed herein may extract one or more types of entities for further processing.

In one embodiment, fraud detection system 400 may receive client file 215 at a scheduled interval. For illustrative purposes, client file 215 may contain one million clicks within a given time period of one day, which, on average, may take about half an hour or less to process and generate block list 220.

More specifically, in some embodiments, fraud detection system 400 may operate to analyze client file 215, construct representations of entities contained in client file 215, perform clustering on the representations thus constructed, identify IP addresses that might indicate potential collusion, and send block list 220 containing the identified IP addresses to client site 210. In some embodiments, fraud detection system 400 may operate to apply one or more filters to further optimize block list 220 such as removing known false positives, etc. For example, database 280 which is accessible by fraud detection system 400 may maintain a list of verified or legitimate IP addresses. Fraud detection system 400 may utilize that list to validate the identified IP addresses, thus removing false positives and making the final list more accurate.

Figure 3:
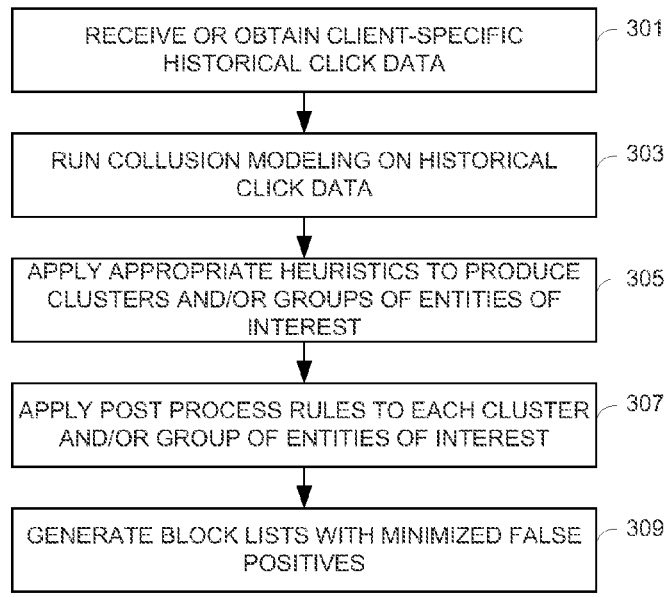
FIG. 3 depicts a flow diagram illustrating one example embodiment of a collusion detection process.
Figure 4:
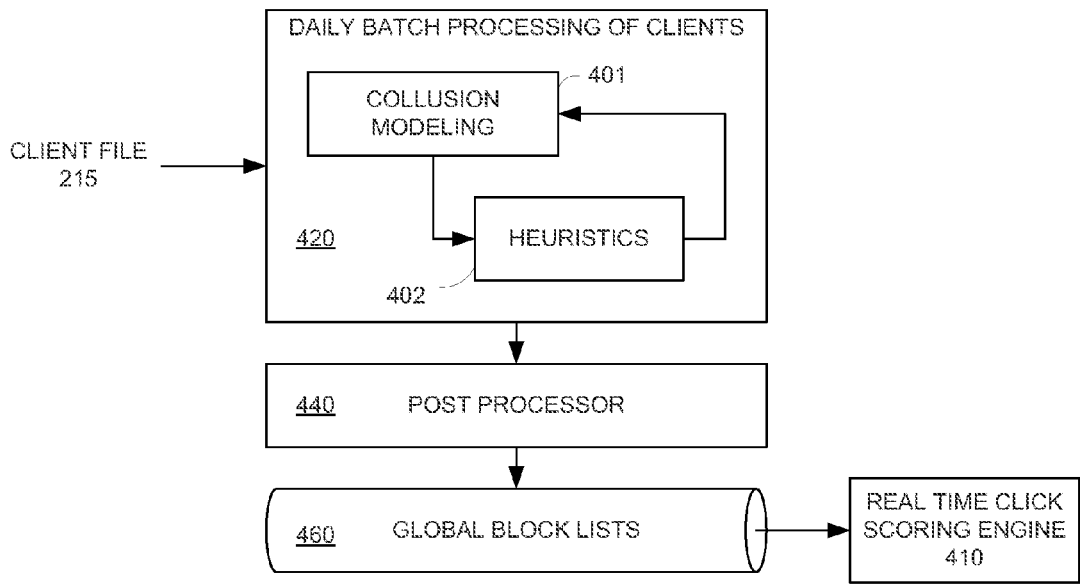
FIG. 4 depicts a diagrammatic representation of one example embodiment of a collusion detection system.

FIG. 3 depicts a flow diagram illustrating one example embodiment of collusion detection process 300 and FIG. 4 depicts a diagrammatic representation of one example embodiment of collusion detection system 400 implementing process 300. In some embodiments, formulating potential collusion among entities extracted from historical click data as a network problem may comprise constructing network representations of the entities and their relationships, partitioning the network representations into subgroups of nodes to maximize a number of connections between the nodes in each subgroup, and forwarding the subgroups to a network analyzer for producing a first set of potentially colluding entities. In some embodiments, constructing network representations of the entities and their relationships may further comprise utilizing nodes to represent the entities and utilizing connections between the nodes to represent the relationships between the entities. In some embodiments, the network representations are constructed in accordance with a set of rules that include definitions of entity relationships with respect to collusion detection.

In some embodiments, at server site 220, historical click data may be received or obtained from a client (step 301). In some embodiments, client file 215 may contain historical click data. In some embodiments, fraud detection system 400 may comprise collusion modeling 401 for processing the historical click data received from client site 210 and generating clusters and/or high density subgraphs (step 303). In some embodiments, collusion modeling 401 may be implemented as a software module or system. Further details on collusion modeling 401 are described below.

In some embodiments, fraud detection system 400 may further comprise heuristics 402. Heuristics 402 may be applied to results from collusion modeling 401 to produce high density subgraphs and/or high dimensional clusters (step 305). In some embodiments, results from heuristics 402 may be provided to collusion modeling 401 in an iterative process.

In some embodiments, collusion modeling 401 and heuristics 402 may operate on a daily basis as part of daily batch processing 420.

In some embodiments, fraud detection system 400 may further comprise post processor 440 for processing the high density subgraphs and/or high dimensional clusters from daily batch processing 420. In some embodiments, post processor 440 may apply post process rules to each cluster and/or group of entities of interest (step 307). An example of a primary function of post processor 440 would be to produce block lists while minimizing false positives (step 309). In some embodiments, these block lists may be client-specific. An example of a post process rule may filter out known legitimate IP addresses.

In some embodiments, fraud detection system 400 may further comprise storage location or database 460 for storing block lists, including block list 220 for client 210, generated by post processor 440. In some embodiments, block list storage location 460 is accessible by real time click scoring engine 410. In some embodiments, real time click scoring engine 410 may score each click in real time utilizing information stored on block list storage location 460.

In some embodiments, fraud detection system 400 may operate to build a framework based on the historical click data to capture the underlying information for collusion detection. In this framework, graphs and/or vector spaces that represent useful pieces of information may be built or otherwise constructed for a given client. To detect collusion (click fraud), each of these representations (a graph or a vector space) may be examined and analyzed as an optimization problem (a computational problem). As collusion detection may be modeled as a clustering problem with certain metrics, heuristics that are highly accurate and highly scalable for large data sets (clusters) may be developed and/or applied to identify IP addresses that indicate potential collusion.

In the context of fraud detection, certain types of patterns in the representations of information pertaining to collusion can be useful to mine. As an example, consider the problem of detecting collusion where a subgroup of referrers (possibly hundreds) and a subgroup of users or visitors (possibly several thousand) are involved in a scheme. Although the general traffic may look very normal, there are certain characteristics (or patterns) corresponding to these visitors and referrers that are distinct. For example, certain users may visit certain referrers more frequently than other referrers, their time or frequency of visits may be very similar (which is a characteristic of a click farm), and the type of search keywords may also appear to be very similar, etc. One approach to detect these patterns is to enumerate all the possible combinations. This approach is computationally infeasible, since there can be millions of visitors and thousands or hundreds of thousands of referrers.

In some embodiments, collusion modeling 401 may utilize a plurality of collusion modeling approaches, including a network modeling approach (see FIGS. 5-8) and a high dimensional vector space clustering modeling approach (see FIGS. 9-10), to capture the right information that is relevant to detect collusion and/or predict traffic quality (TQ). Implementing these modeling approaches, in some embodiments, collusion modeling 401 is operable to formulate (or model) various collusion detection and traffic quality prediction problems as network analysis or clustering problems. More specifically, collusion modeling 401 is operable to formulate, for each client, the analysis of groups of entities as graph partitioning or high dimensional vector space clustering problems to capture the groups of entities that look "abnormal." In the case of graphs, the notion of "abnormality" may be captured by densities, which, in some embodiments, can be defined by the number of edges and/or the number of nodes. In the case of clusters, the notion of "abnormality" may be captured by grouping entities with similar patterns—with respect to time, frequency, gaps between clicks, keywords, etc. These collusion modeling approaches will now be further described in detail.

Figure 5:
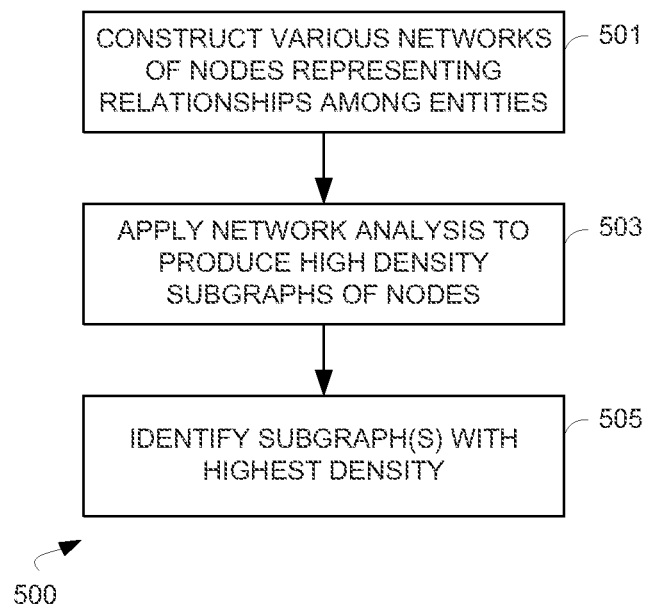
FIG. 5 depicts a flow diagram illustrating one example embodiment of a network modeling approach for collusion detection.

FIG. 5 depicts a flow diagram illustrating one example embodiment of network modeling approach 500 for collusion detection. In some embodiments, for each client, collusion modeling 401 may first construct various networks of nodes representing relationships among entities (step 501). Collusion modeling 401 may then operate to analyze the relationships to partition these nodes into high density subgraphs (step 503) and find a subset of nodes that have the highest density (step 505).

Within this disclosure, a graph is a mathematic representation of a network of entities and their relationships. It is denoted by $G=(V, E)$, where V is a set of nodes and E is a set of edges that connect the nodes. A bipartite graph is a graph with two sets of nodes and edges that connect the nodes across the sets (not within the sets); it is represented by $G=(V1, V2, E)$. In this network representation, nodes correspond to entities and edges correspond to the relationships between pairs of entities. In some embodiments, weights are attached to these edges to denote the strength of connections.

This network modeling approach can be easily generalized to any type of entities, allowing various types of relationships be examined to extract useful patterns, examples of which are briefly outlined as follows.

Consider a graph representing a network of nodes, each node corresponding to a publisher. Suppose two nodes are connected if the corresponding publishers share at least a given number (per a defined threshold) of IP addresses (IPs). Given such a network, a high density subgraph may correspond to potential publisher collusion, since it is highly unusual that these publishers are being visited by the same IPs.

As another example of detecting botnets, a graph representing an IP to IP network may be constructed such that two nodes are connected if they visit the same referrers or use the same keywords, etc.

As yet another example, consider the detection of collusion among referrers of a given publisher and their visitors. Intuitively, one of the patterns exhibited by collusion is a subset of visitors frequently visiting the same referrers. Detection of such type of behavior can be modeled as follows.

Figure 6:
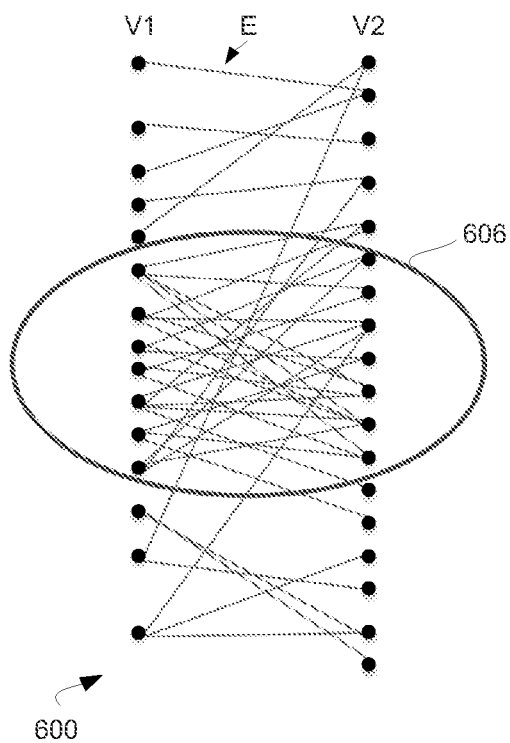
FIG. 6 depicts a diagrammatic representation of one example of a bipartite graph.

FIG. 6 depicts a diagrammatic representation of one example of a bipartite graph. As illustrated in FIG. 6, bipartite graph 600 may be represented by $G=(V1, V2, E)$. In this example, nodes in V1 correspond to visitors (entities of a first type) and nodes in V2 correspond to referrers (entities of a second type). Each edge E between a node in V1 and a node in V2 indicates a visitor, represented by the corresponding node in V1, visiting a particular referrer, represented by the corresponding node in V2. In some embodiments, the edges are weighted. In some embodiments, weights can be the number of clicks. For example, an edge may connect a visitor node with a referrer node if an IP address associated with the visitor node visits the same referrer at least five times during a certain defined period of time. Other implementations are also possible. As a specific example, area 606 in bipartite graph 600 shows that of all the nodes in V1 and V2, a certain subset of visitors appear to visit a certain subset of referrers frequently.

Figure 7A:
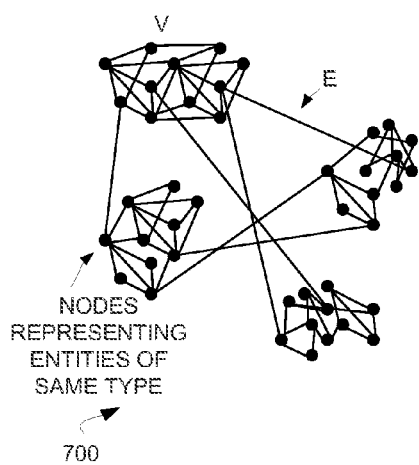
FIG. 7A depicts a diagrammatic representation of an example graph constructed from a bipartite graph.
Figure 7B:
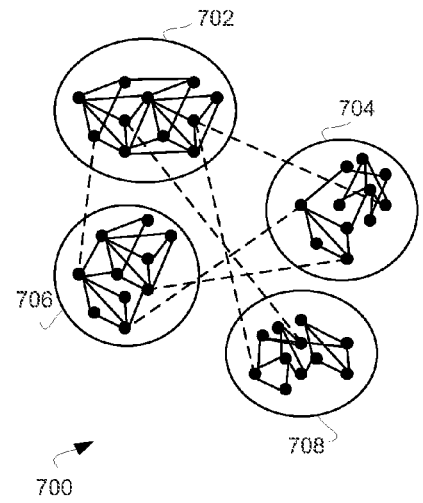
FIG. 7B depicts a diagrammatic representation of the graph of FIG. 7A after the network analysis of FIG. 5.

FIG. 7A is a diagrammatic representation of one embodiment of an example graph constructed from a bipartite graph. As illustrated in FIG. 7A, graph 700 may be represented by $G=(V, E)$. In this example, nodes in V correspond to referrers. Each edge E between two nodes indicates that the corresponding referrers share a number of visitors. In some embodiments, the edges can be weighted. In some embodiments, weights may correspond to a number of visits. In some embodiments, weights may correspond to a number of common visitors. In some embodiments, weights may correspond to the amount of ad revenue. Other implementations are also possible. For example, an edge may connect two nodes if they share at least ten distinct visitors' IP addresses. FIG. 7B is a diagrammatic representation of one embodiment of an example graph having anomalous patterns. In this example, anomalous patterns in graph 700 are represented by subgraphs 702, 704, 706, 708, each of which may have a significantly higher number of connections than other subgraphs of same size. In some embodiments, certain connections (edges) and/or nodes may be filtered out as they may be statistically insignificant (represented by dotted lines). For example, IP addresses with low volumes of clicks may be removed from further consideration.

Figure 8:
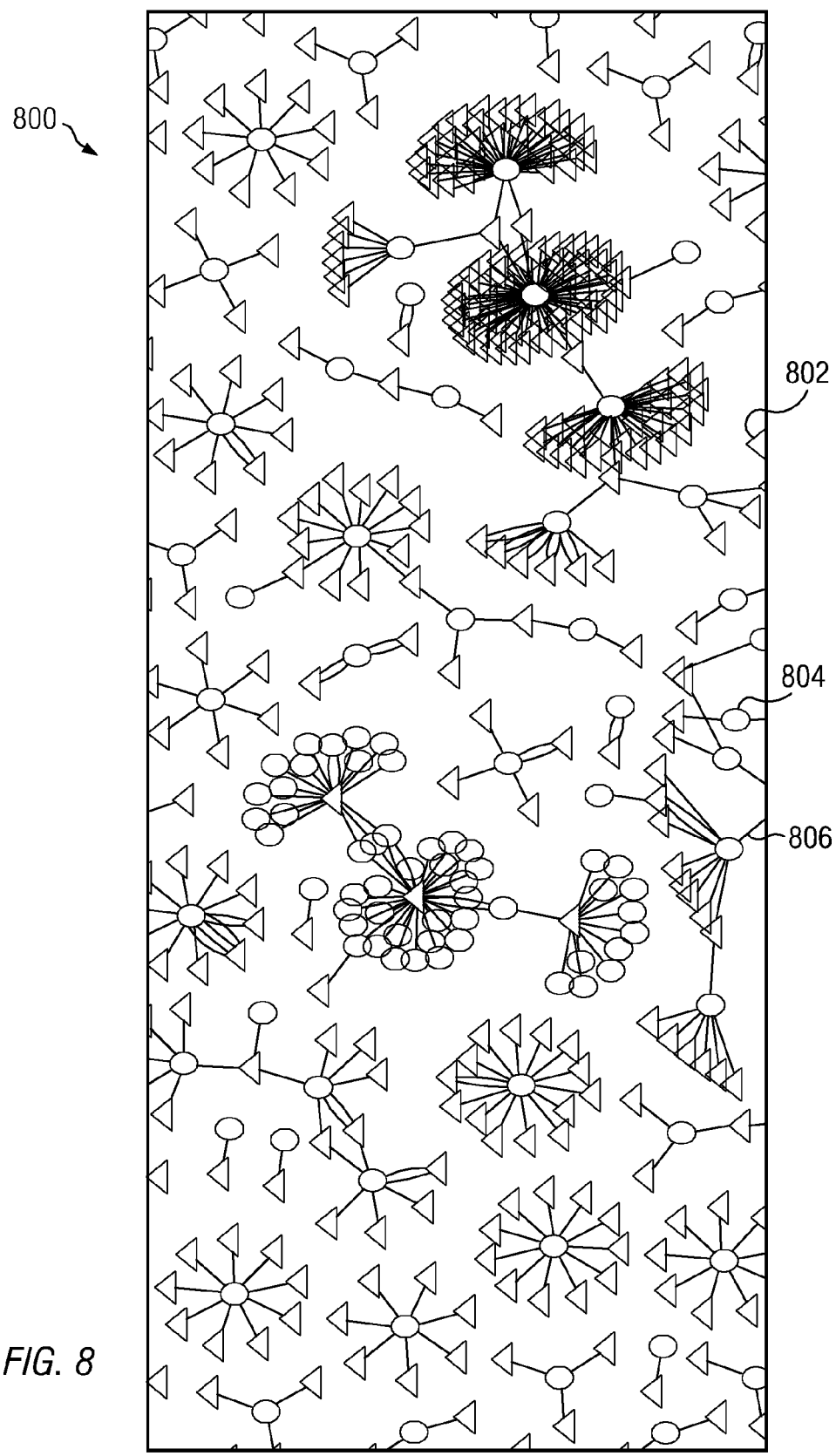
FIG. 8 depicts a diagrammatic representation of another example bipartite graph, showing high density subgraphs.

FIG. 8 depicts a diagrammatic representation of another example bipartite graph, showing high density subgraphs. In this example, bipartite graph 800 may be represented by $G=(V1, V2, E)$, where nodes in V1 correspond to entities of a first type (802) and nodes in V2 correspond to entities of a second type (804). For example, entities 802 may comprise IP addresses and entities 804 may comprise domains. Each connection 806 may represent a link or association, perhaps weighted, between an IP address and a domain. High density subgraphs may be generated from bipartite graph 800 in a similar manner as described above with reference to FIGS. 7A and 7B.

Since these high density subgraphs may suggest potential collusion, the graph framework as described above can offer a broad approach to analyze relationships to detect collusion. For example, in some embodiments, a graph may be partitioned into k subgraphs to maximize the number of connections in each subgraph. Various metrics can be used to perform partitioning and produce high density subgraphs. Example metrics may include: density, total weight, low cost cuts (a set of edges that disconnect the graph into subgraphs), sparse cuts, min-cuts, etc. Some of the well known graph partitioning problems that are relevant in the context of collusion may include:

1. Min-k cut, ratio cuts that aim at partitioning the graph into high density subgraphs.
2. K-dense subgraphs (find the densest subgraph of k nodes).
3. Densest k-subgraph.

Graph partitioning problems have been well studied in the literature and thus are not further described herein.

High Dimensional Vector Space Clustering Modeling

In some embodiments, vector spaces may be generalized to create signatures of various entities (multidimensional). These signatures can be monitored to see changing trends to detect collusion.

Figure 9:
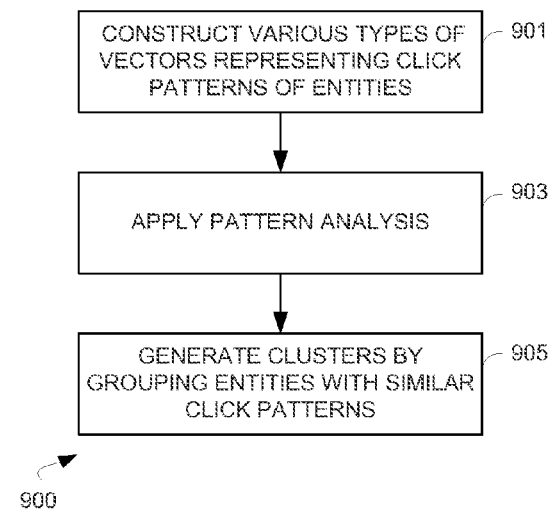
FIG. 9 depicts a flow diagram illustrating one example embodiment of a high dimensional vector space clustering modeling approach for collusion detection.

FIG. 9 depicts a flow diagram illustrating one example embodiment of high dimensional vector space clustering modeling approach 900 for collusion detection. In some embodiments, for each client, collusion modeling 401 may construct various types of vectors representing click patterns of entities (step 901). Collusion modeling 401 may then operate to analyze these vectors to find similar patterns with respect to time, frequency, gaps between clicks, keywords selected, etc. (step 903) and generate clusters by grouping entities with similar patterns (step 905). Examples of anomalous patterns may include:

Click activity times (usually exhibited by humans);

Frequency of clicks in a given period of time (usually exhibited by bots); and

The gaps between consecutive clicks (usually exhibited by humans).

As an example, collusion modeling 401 may construct time series vectors for each referrer and IP combination (in the vector space model). Here, the time series vectors represent clicking patterns, so if a subset of these entities have similar time series, it may represent referrer and IP collusion. Collusion modeling 401 may then formulate this as a high dimensional clustering problem.

Essentially, a vector is an array of real numbers—a signature of some sort. The length of the array is the dimensionality of the vector. Alternatively, each vector can be thought of as a point in some high dimensional space. In the vector space model, similarity of two vectors can be measured using distance norms, and L1, L2 and L_inf are the most useful norms. In many practical applications, the number of dimensions is huge. When input data involves a large number of real attributes, vector spaces may be a more suitable representation than graphs, since they preserve more information. For example, in click farms, humans are employed to click on the ads. Assuming certain types of click farms exhibit similar clicking behavior, this type of fraud may be detected by analyzing time patterns associated with the clicks.

Let T denote the time period of the data. T is divided into buckets Bi, representing a time slot. (Note that these buckets Bi need not be uniform). For each visitor (or referrer or publisher), measure the volume of traffic coming into Bi. Thus, for each IP there corresponds a time series vector of high dimensions. The probability of a group of IP addresses having very similar clicking patterns across a given time period is usually very small and is an indication of anomalous activity. Detection of groups of IP addresses that have similar clicking patterns in the time domain can be modeled as a clustering problem. Many well known clustering methods can then be used to identify "interesting" IP addresses.

An example method for detecting visitors or referrers that have similar anomalous patterns may comprise dividing a time period into time slots (T). This time period may represent a defined length of time during which network traffic is monitored by a system implementing an embodiment disclosed herein. A graph (G) can then be constructed by analyzing click activities in these time slots. For example, let G=(V, E) denote the network of user devices at various IP addresses. Here, two nodes are connected if the corresponding IP addresses share a number of time slots, meaning they are active in these time slots. In some cases, there might be noise in G. Such noise may be removed or otherwise reduced utilizing filters. For example, a filter may be utilized to remove known cluster(s) of IP addresses. This may be an optional step. Given such a graph, anomalous time patterns can be identified by finding subgraph(s) containing a large number of connections.

The above time series analysis analyzes click patterns in time. A frequency analysis may identify anomalous frequency patterns even if they are shifted in time. For example, bots may start at different times but may have very similar frequency of clicking in a given period of time. In some embodiments, this type of fraud may be detected by analyzing frequency patterns associated with the clicks.

Figure 10:
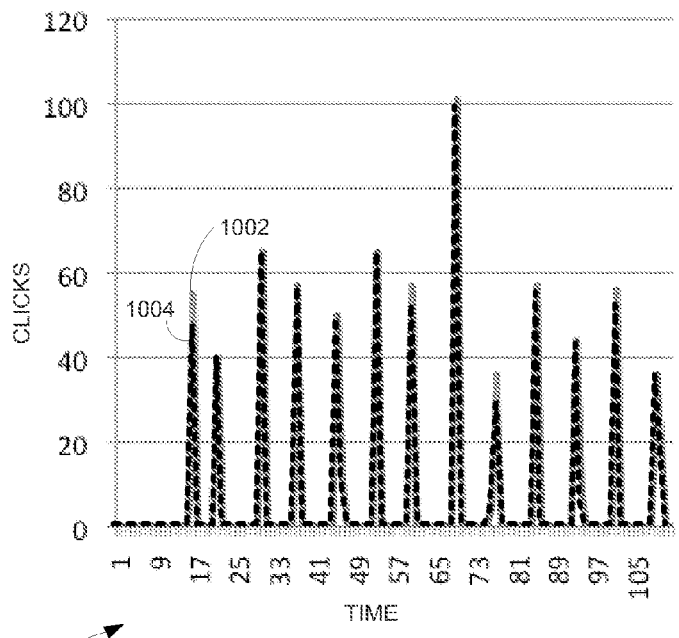
FIG. 10 depicts a plot diagram that exemplifies entities having similar frequency patterns in a given period of time.

FIG. 10 depicts a plot diagram exemplifying one example of two entities having similar frequency patterns in a given period of time. In this example, it can be seen from plot 1000 that frequency series 1002 and 1004, each corresponding to a particular IP address, share a number of frequency slots and have very similar frequency patterns, indicating potential collusion. In this case, the frequencies of clicks from individual IP addresses may be obtained by performing Fast Fourier Transformation on each time slot T. Thresholds may be used to filter out some frequencies. For example, post processor 440 may remove from consideration IP addresses with fewer than five clicks in a given period of time. This step may be optional. Now let G=(V, E) denote the network of IP addresses where two nodes in V are connected via E to indicate that the corresponding IP addresses share a number of frequency slots. Given such a graph, a subgraph containing a large number of connections represents IP addresses with very similar frequency patterns may be identified as an indication of potential collusion.

Figure 11:
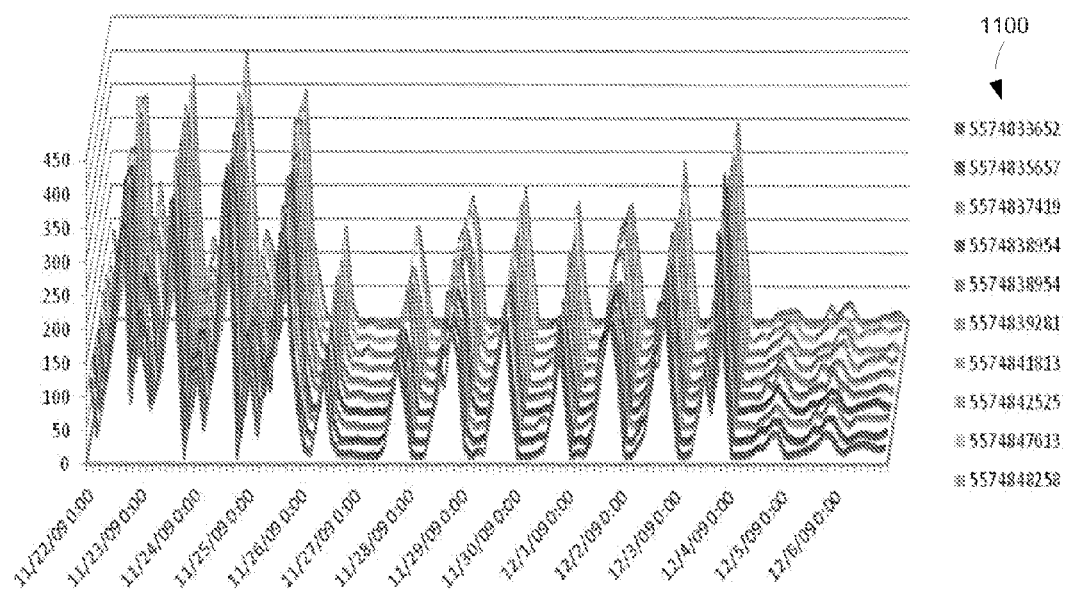
FIG. 11 depicts a plot diagram that exemplifies entities having similar time or frequency patterns in a given period of time.

In some cases, in order to evade detection, a bot or human may change its click times—shifting the click times by some amount. However, the frequency of clicking may not change much, if it is the same bot or human. In such cases, the time domain vectors can be transformed into frequency domain vectors and clustering can be performed on them. FIG. 11 depicts a plot diagram that exemplifies entities 1100 having similar time or frequency patterns in a given period of time. Again, the probability of a group of IP addresses having very similar frequency patterns is very low—in fact, it reduces as the number of dimensions increases—and is an indication of anomalous activity.

In addition to the time series analysis and the frequency series analysis, in some embodiments, gaps between consecutive clicks can be divided into gap slots and analyzed as described above. Similar to time buckets, vectors of gaps can also be constructed. First, find the maximum possible gap between clicks and divide a given time period into buckets. For each IP address and for each bucket, measure the volume of clicks. This results in a multidimensional vector for each IP address. Perform clustering on these vectors to find IP addresses that have similar gap vectors. As a specific example, for each visitor at a particular IP address (or referrer or publisher), divide a given time period of, say, two weeks, into time buckets of, say, 1 hour. This results in a 128 dimensional vector for each IP address.

Figure 12:
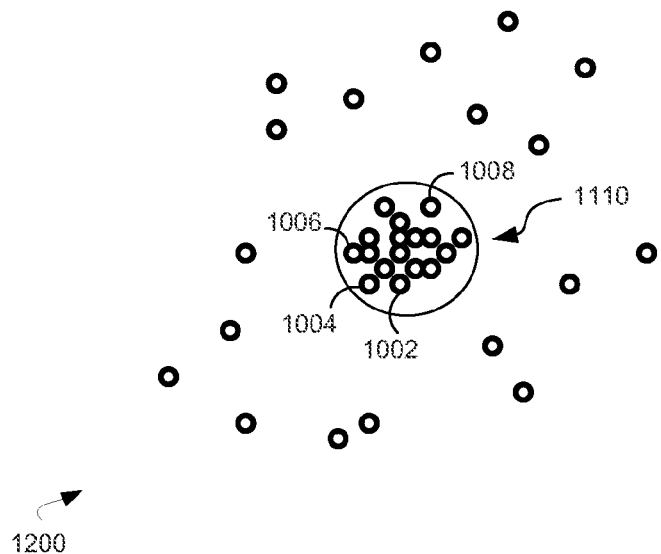
FIG. 12 depicts a diagrammatic representation of an example vector space with many proximal points.

FIG. 12 depicts a diagrammatic representation of example vector space 1200 with many proximal points 1002, 1004, 1006, 1008, etc. in cluster 1110, an indication of interesting activity. Cluster 1110 may correspond to a bot activity if these points represent IPs or keywords with very similar time or frequency patterns. For example, as illustrated in FIG. 10, points 1002 and 1004 have very similar click frequency patterns over the same period of time, indicating potential collusion between entities represented by points 1002 and 1004.

The collusion modeling described above can provide a powerful tool that can generate various types of models relevant for detecting collusion. Those skilled in the art will appreciate that embodiments of the collusion modeling disclosed herein are not limited to the aforementioned models. It is designed in a flexible and plug-and-play environment and can be easily updated to include new models to capture the new types of collusion. Furthermore, it can be tuned (or parameterized for each client). For example, in some embodiments, collusion modeling 401 may comprise a client specific configuration file containing various features which may include (1) types of networks; (2) types of vectors; (3) tuning parameters; and (4) formulations of network analysis and/or vector analysis problems.

Figure 13:
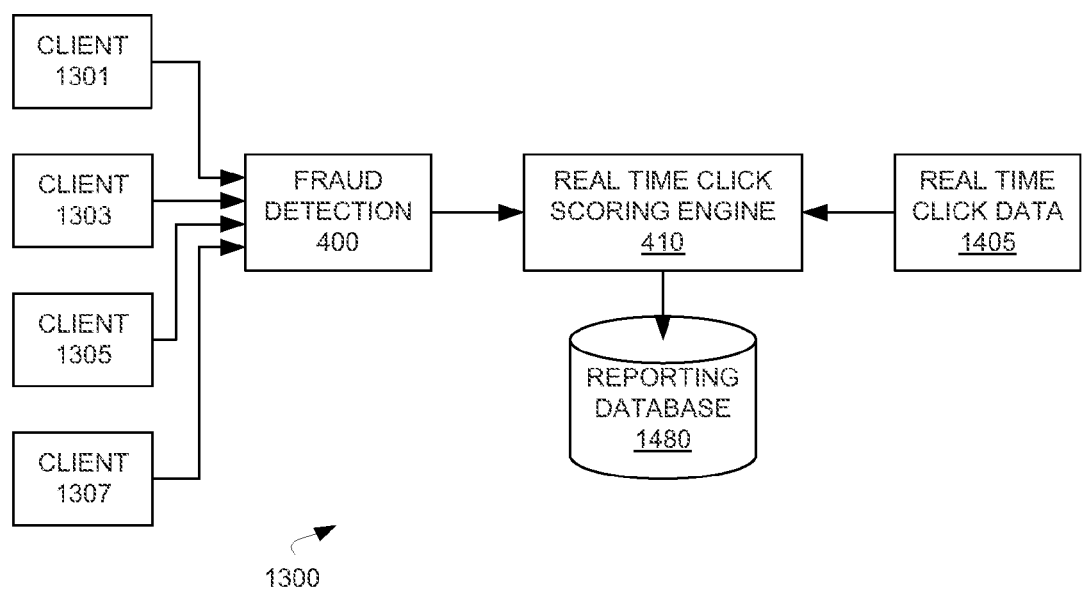
FIG. 13 depicts a diagrammatic representation of an example embodiment of a collusion detection and traffic quality prediction system.

The collusion modeling described above can be part of a complete system that provides comprehensive, fast and scalable collusion detection and traffic quality prediction to multiple clients. FIG. 13 depicts a diagrammatic representation of an example embodiment of collusion detection and traffic quality prediction system 1300 communicatively coupled to clients 1301, 1303, 1305, 1307. System 1300 may receive files containing historical click data from these clients or obtain the historical click data from click data warehouse(s) 1415 maintained by the clients. Fraud detection 400 may process the historical click data and generate/update global block lists 460 as described above. Real time click scoring engine 410 may utilize global block lists 460 to score real time click data 1405 and generate click score reports accordingly. In some embodiments, real time click data 1405 may be directed to real time click scoring engine 410 by clients 1301, 1303, 1305, 1307. The generated reports may be sent to clients 1301, 1303, 1305, 1307 and/or stored in reporting database 1480. In some embodiments, clients 1301, 1303, 1305, 1307 may have access to reporting database 1480.

Figure 14:
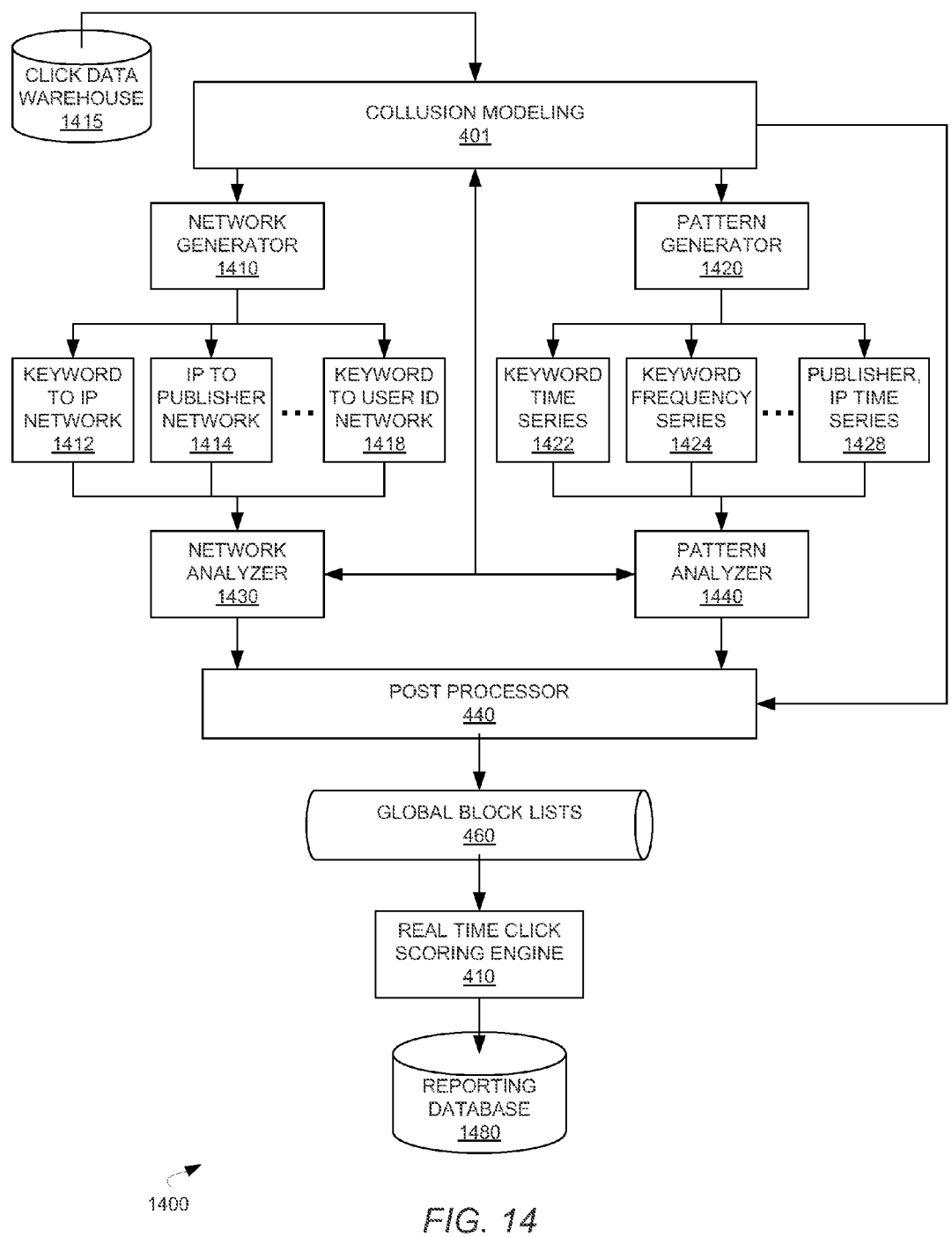
FIG. 14 depicts a diagrammatic representation of an example embodiment of a collusion detection flow between system components.
Figure 15:
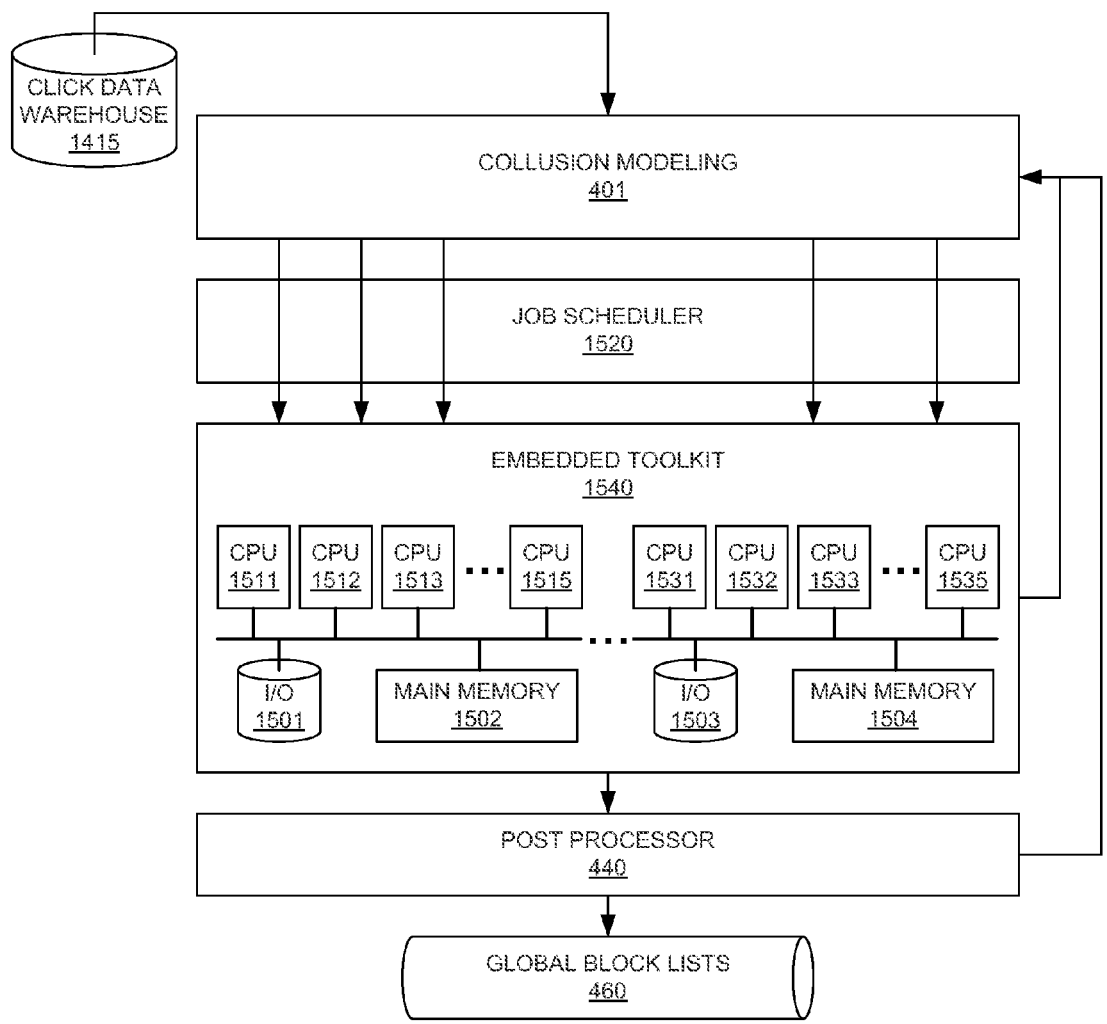
FIG. 15 depicts a diagrammatic representation of an example embodiment of a collusion detection and traffic quality prediction system operating in a scalable and distributed environment.

System 1300 employs various modules to generate lists of IPs, publishers, referrers, cookies, etc. that the clients of system 1300 (e.g., publishers, ad networks and advertisers) can use them in real time to block unwanted traffic and maximize their profits. FIG. 14 depicts a diagrammatic representation of an example embodiment of collusion detection flow 1400 between components (also referred to herein as modules) of system 1300. FIG. 15 depicts a diagrammatic representation of an example embodiment of collusion detection and traffic quality prediction system 1300 operating in scalable and distributed environment 1500. In some embodiments, main components of system 1300 may include a modeling module (e.g., collusion modeling 401), a toolkit (e.g., toolkit 1540), a post processor (e.g., post processor 440), and a job scheduler (job scheduler 1520). These components work in concert to provide a distributed, extensible, robust, efficient and highly accurate collusion detection and TQ prediction system. Additionally, system 1300 can scale well as the number of clients and their data volumes increase.

Modeling Module

The modeling module formulates (or models) various collusion detection and TQ prediction problems as network analysis (graph partitioning in particular) or high dimensional clustering problems. To detect collusion, the modeling module is operable to process historical click data, extract entities that may be involved in click fraud, and analyze groups of entities thus extracted. Several types of entities may be involved in a click fraud: end users, referrers, publishers and sub-publishers, Ad networks, and advertisers. In some embodiments, the modeling module may extract the following types of entities.

IPs
Referrers
Publishers and subpublishers
Ad networks
Advertisers

For each client, the modeling module may formulate the analysis of groups as graph partitioning or high dimensional vector space clustering problems to capture the groups of entities that look "abnormal." In the case of graphs, the notion of "abnormality" can be captured by densities (number of edges/number of nodes). In some embodiments, for each client, the module first constructs various networks and various types of vectors that capture the right information that is relevant to capture type of collusion or TQ prediction.

In some embodiments, the modeling module is embedded with a client specific configuration file containing various features: (1) types of networks; (2) types of vectors; (3) tuning parameters; and (4) formulations of network analysis or vector analysis problems.

In some embodiments, the modeling module implements the network modeling and vector space clustering modeling approaches described above. With the network modeling approach, the modeling module may detect publisher collusion as follows: each node of a network corresponds to a publisher where two nodes are connected if the corresponding publishers share at least a given number (using threshold) of IPs. Given such a network, a high a dense subgraph (using thresholds) corresponds to potential publisher collusion, since these publishers are being visited by the same IPs which is highly unusual. In some embodiments, the modeling module may formulate the collusion detection in several ways. For example, the modeling module may partition the network in to high dense subgraphs or find a subset of k nodes that have the highest density etc. As another example of detecting botnets, the modeling module may construct IP to IP network based on whether IPs visit the same referrers or use the same keywords, etc.

As an example of the vector space modeling approach, the modeling module may construct time series vectors for each referrer and IP combination in a vector space model. Here, the time series vectors represent clicking patterns, so if a subset of these entities have similar time series, it may indicate a potential referrer and IP collusion. The modeling module may then formulate this as a high dimensional clustering problem.

The prediction of TQ for a given ad network (either inbound or outbound) depends on various factors, including keywords. Currently, various click rules have been developed to score each click or a small group of clicks separately and then aggregate them over the entire traffic to predict the TQ of a given feed of an ad network. Although this approach works very well in general, there are various cases where prediction of TQ requires analyzing the entire traffic rather than individual clicks. The modeling module models the analysis of user behavior as network analysis problem to predict TQ. In particular, the module first constructs a keyword network and then models it as dispersion analysis on networks. Here, in the network each node corresponds to a keyword and two nodes are connected if the corresponding keywords share an IP (or several IPs depending on the threshold). Given such a network, the modeling module models it as a problem of identifying a large subgraph with large dispersion. Since this subgraph corresponds to IPs that are randomly clicking on many keywords, it may be an indication that they are less likely to convert and hence low TQ.

In some embodiments, the modeling module utilizes various metrics that include sparse cuts, min-cuts, to partition a graph (network) into high dense subgraphs, etc. In some embodiments, the modeling module utilizes high dimensional vector clustering methods that can be performed on multidimensional vectors, including k-means (minimizes the maximum standard deviation of each cluster), k-center (minimizes the maximum radius of each cluster), k-median, and different metrics of hierarchical (single linkage, double linkage, etc).

The modeling module is a powerful tool that can generate various types of models relevant for detecting TQ. The module includes, but not limited to the aforementioned network and clustering models. It is designed in a flexible and plug-and-play environment, so it can be easily updated to include new models to capture the new types of collusions. Furthermore, it can be tuned (or parameterized for each client).

Network Analysis and High Dimensional Clustering Toolkit

Given the modeling component models collusion detection and TQ prediction as clustering on graphs or vector spaces, the next step is to apply the right clustering methods to solve them, thereby generating clusters or groups of entities that can be further analyzed by a post processor. It is well known that graph partitioning and vector space clustering problems can be computationally difficult as well as costly to solve. However, embodiments disclosed herein implement many existing heuristics that work very well in practice. More specifically, embodiments of the system disclosed herein integrate highly accurate, efficient, and scalable heuristics, collectively referred to as a network analysis and high dimensional clustering toolkit. The toolkit may include heuristics developed for general clustering methods, including various heuristics for sparse cuts, k-cuts, high dense subgraph partition, etc. These heuristics may range from spectral graph partitioning methods to greedy approaches to such randomized algorithms as simulated annealing.

Examples of suitable heuristics may include:
Combinatorial approaches such as greedy approaches.
Linear programming approaches.
Spectral methods that convert the graphs into vector space models. First, the Laplacian of the graph is constructed. Then, the eigen vectors of these Laplacians are determined, one eigen vector corresponding to each node. Clustering on these Eigen vectors is a good approximation of clustering on the corresponding graphs—since it is a relaxation of the integer quadratic program. Various well-known clustering algorithms can be applied on these eigen vectors where for each node there corresponds an eigen vector using the Laplacian of the graph.
Singular value decomposition (SVD) may be utilized to significantly reduce the data size via low rank approximation. More specifically, SVD also converts a bipartite graph into a vector space model. Consider a bipartite graph G=(V1, V2, E), where V1 corresponds to referrers and V2 corresponds to visitors with distinct IP addresses. In this case, there are no edges between any pair of referrers or any pair of IP addresses. The SVD technique is used in latent semantic indexing (LSI) of document classification in which two documents are considered similar if they share a lot of keywords. Here, the bipartite graph between documents and terms is decomposed into three matrices, D, T and S, where D is the document concept matrix, T is the term concept matrix, and S is a diagonal matrix of singular values. Clustering on D provides document classification and clustering on T provides term classification. Utilizing this technique, in some embodiments, two referrers are considered similar if they share a lot of visitors (IP addresses). Similarly, two IP addresses are similar if they share a lot of referrers. Referrer and visitor matrices can then be obtained by decomposing the bipartite graph between them. Using any standard k-means, k-center clustering methods on these matrices can generate clusters of highly related items. Further analysis on these clusters can be done to detect potential collusions.

The last two approaches transform the graphs into vector spaces and clustering is performed on eigen vectors. Other dimensionality reduction techniques such as principal component analysis (PCA) may also be utilized to improve the run of clustering as well as to reduce the noise.

Additionally, the toolkit may include heuristics developed for social networks. We have observed that the underlying networks are special types of networks and hence we exploit the underlying characteristics to improve accuracy and efficiency. For example, we have observed that the underlying networks have low average density and the corresponding matrices are sparse. Accordingly, some embodiments may have sparse matrix implementations. To handle high dimensional vectors, some embodiments of the toolkit are equipped with dimensionality reduction techniques, including PCA and SVD.

Furthermore, the toolkit may include heuristics for solving graph clustering problems in the vector space model (using spectral methods) by computing the second eigen values of the corresponding Laplacian matrices or using SVD (similar to latent semantic indexing for document classification) model on bipartite graphs.

Referring to FIG. 14, flow 1400 may comprise receiving historical click data from warehouse 1415, processing the historical click data at collusion modeling 401 to create various network and/or clustering models for detecting potential collusions. In some embodiments, flow 1400 is client specific (i.e., the potential collusions thus modeled may be specific to a particular client based on the historical click data specific to that client). As described above, collusion modeling 401 may transform potential collusions hidden in the historical click data into network and/or clustering problems that can be solved and analyzed via appropriate heuristics. In this context, flow 1400 may further comprise applying appropriate heuristics to the network and/or clustering problems generated by collusion modeling 401. In some embodiments, these heuristics may be collectively referred to as toolkit 1540.

In some embodiments, toolkit 1540 may comprise network generator 1410 and pattern generator 1420. In some embodiments, network generator 1410 may generate, based on modeled networks produced by collusion modeling 401, various types of networks, including keyword to IP network 1412, IP to publisher network 1414, keyword to user ID network 1418, etc. Other types of networks are also possible. Further, as described above, network generator 1410 may be easily adapted to generate new types of networks. In some embodiments, based on modeled clusters produced by collusion modeling 401, pattern generator 1420 may generate various types of clusters or groups, identifiable through keyword time series 1422, keyword frequency series 1424, publisher-IP time series 1428, etc. Other types of clusters and groups are also possible. Again, pattern generator 1420 may be easily adapted to generate new types of clusters and groups. In some embodiments, toolkit 1540 may further comprise network analyzer 1430 and pattern analyzer 1440. In some embodiments, network analyzer 1430 may operate to analyze high density subgraphs as described above with reference to FIGS. 5-8. In some embodiments, network analyzer 1430 may operate to detect anomalous subgraphs. In some embodiments, network analyzer 1430 may operate to identify different types of collusions. For example, network analyzer 1430 may operate to distinguish collusion among IPs or referrers from collusion between IPs and referrers, both types indicating unusual behavior between a subset of IPs and a subset of referrers.

In some embodiments, pattern analyzer 1400 may operate to analyze high dimensional clusters or groups of entities as described above with reference to FIGS. 9-12. In some embodiments, network analyzer 1430 may operate to detect anomalous clusters or groups of entities. In some embodiments, pattern analyzer 1400 may operate to identify different types of collusions.

In some embodiments, flow 1400 may comprise forwarding results (i.e., subgraphs meeting a certain density requirement) from network analyzer 1430 back to collusion modeling 401 for updating an existing network model. In some embodiments, flow 1400 may comprise forwarding results (i.e., clusters or groups meeting a certain patterning requirement) from pattern generator 1420 back to collusion modeling 401 for updating an existing clustering model. In some embodiments, flow 1400 may further comprise forwarding updated results from collusion modeling 401 to post processor 440.

Post Processor

The post processor comprises a suite of rules applicable to the resulting high density subgraphs as well as high dimensional clusters or groups of entities for further analysis. A primary function of this module is to extract block lists while minimizing false positives. More specifically, the post processor may first filter out certain data that is not suspicious based on various rules. The post processor may then process the remaining data through rigorous checking based on various additional pieces of information.

For example, collusion modeling 401 may model a network in which nodes that represent IPs are connected if the IPs share the same keywords. Network generator 1410 may partition this modeled network into subgraphs. Network analyzer 1430 may analyze these subgraphs and produce high density subgraphs, each containing nodes or points representing entities of interest. Post processor 440 may go through each of the high density subgraphs from network analyzer 1430 to first filter out the subgraphs that have density less than some threshold. Post processor 440 may then use several pieces of information to check each of the remaining subgraphs and determine whether any of them is suspicious. Post processor 440 may next place entities in suspicious subgraphs on global block lists 460. In some embodiments, global block lists 460 are utilize by real time click scoring engine 410 to perform real time scoring on incoming real time click data. In some embodiments, real time click scoring engine 410 may generate click data scoring reports which may then be stored on reporting database 1480.

As a specific example, in some embodiments, post processor 440 may utilize the following pieces of information in determining whether any subgraph, cluster, or group of IPs may be suspicious:

1. If the IPs have any similarities in time patterns.
2. If the IPs visited the same referrers or have the same user agents.
3. If the IPs have been identified as suspicious by third party vendor databases, etc.

Job Scheduler

As described above, for each client, the modeling module may generate several networks and several sets of vectors, each corresponding to a particular model. Each of these models becomes a job. Thus, at any given time, there may be several tasks for each client. Example clients of system 1300 may include, but are not limited to, publishers, ad networks, and advertisers, etc. In some embodiments, the system may have a large number of clients. In some embodiments, the number of jobs on a daily basis may be in the hundreds. In some embodiments, the number of jobs on a daily basis may be in the thousands. Since each job can be highly resource intensive, particularly with respect to memory and CPU, some embodiments disclosed herein may be implemented in a distributed computing environment. In some embodiments, a job scheduler is utilized to assign jobs in a queue in a manner that minimizes the completion time while balancing the load. In some embodiments, the job scheduler is operable to schedule individual jobs in homogeneous as well as heterogeneous distributed systems.

FIG. 15 illustrates a heterogeneous system comprising clusters of CPUs 1511, 1512, 1513, 1515, 1531, 1532, 1533, 1535 that have access to main memories 1502, 1504 and click data repositories or warehouse (represented by I/O 1501 and I/O 1503 in FIG. 15). In some embodiments, to reduce the latency, the system may have additional features, including caches, to eliminate or minimize the need to frequently accessing the databases.

In some embodiments, job scheduler 1520 is operable to monitor the capacity and workload of individual resource in environment 1500 and schedule individual jobs from collusion modeling 401 that are to be performed by toolkit 1540 accordingly to minimize the completion time while balancing the load among these resources. In some embodiments, job scheduler 1520 is able to process historical click data for each client on a daily basis. In some embodiments, a daily batch for a client may comprise past few weeks traffic for that client.

The current methodology of TQ prediction looks at each click independent of other clicks. However, each click may look very normal. The accuracy of TQ prediction can be significantly improved if the clicks are analyzed as groups over a period of time. In some embodiments, clicks are aggregated over a period of time and analyzed to identify low TQ. In some embodiments, system 1300 may operate to predict TQ by detecting underlying botnet activities that cause low TQ.

In some embodiments, system 1300 may operate to model TQ prediction as network analysis (graph analysis) and high dimensional clustering (pattern analysis) problems as described above with respect to fraud detection. Network analysis and clustering analysis problems have been studied in computer science and machine learning communities extensively. Embodiments disclosed here take advantage of this extensive knowledge and leverage the work done in this area. For example, having identified entities such as IPs, users, publishers, etc. that are involved in fraudulent activities, they can be placed on global block lists so they can be blocked in real time for all clients of system 1300. In some embodiments, system 1300 may process a few weeks of historical click or traffic data of each client and generate blocked lists on a daily basis. In some embodiments, these blocked lists may be generated on an hourly basis.

Figure 16:
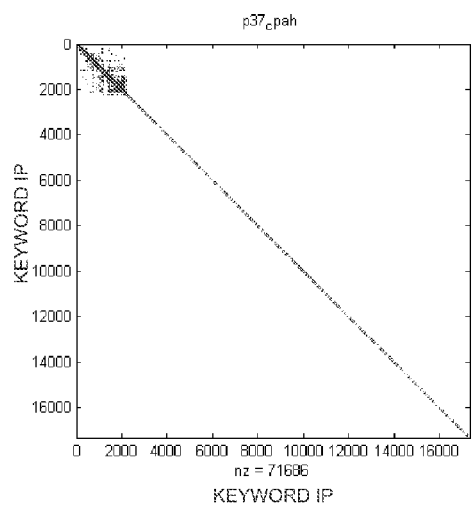
FIGS. 16 and 17 are plot diagrams that exemplify potentially high traffic quality.
Figure 17:
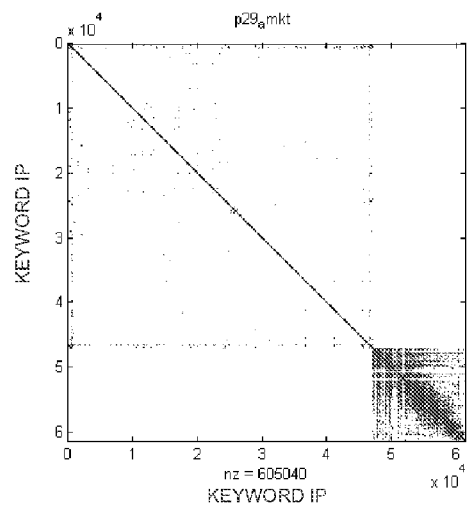
Figure 18:
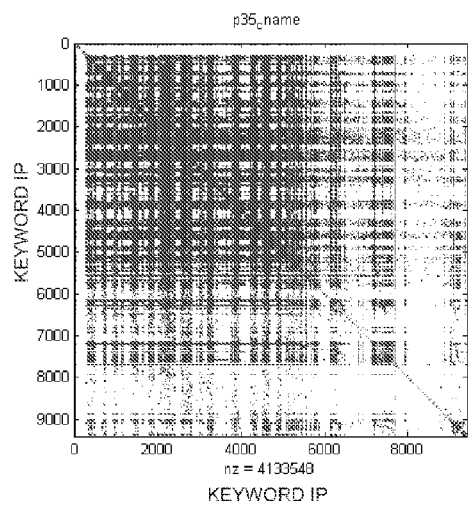
FIGS. 18 and 19 are plot diagrams that exemplify poor traffic quality.
Figure 19:
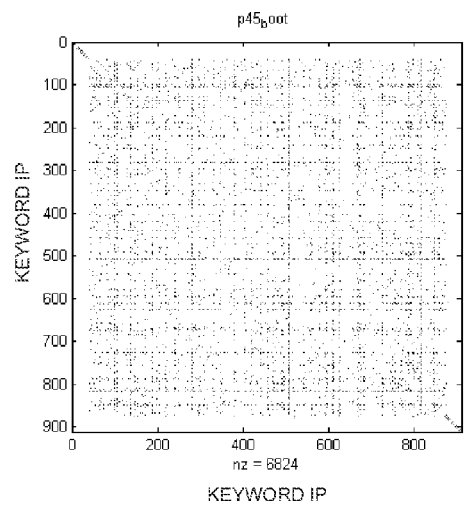

FIGS. 16 and 17 are plot diagrams that exemplify high quality TQ that may be achieved on client networks utilizing embodiments disclosed herein to detect potential collusions and block suspicious entities associated therewith. FIGS. 18 and 19 are plot diagrams depicting client networks that are bombarded by suspicious activities, causing poor traffic quality. As FIGS. 16-19 illustrate, there is a strong coordination between collusion and TQ—the less potential collusions, the higher traffic quality.

As the number of high volume clients (i.e., clients with several hundreds or thousands of clicks everyday) continues to increase at a rapid rate, there is a strong requirement for a robust, highly scalable, and highly accurate collusion detection system. Embodiments of a comprehensive collusion detection and traffic quality prediction system disclosed herein can be run everyday on each of a plurality of high volume clients on large sets of data (e.g., past few weeks of click or traffic data) to detect and generate lists of entities (e.g., IPs, publishers, referrers, etc.) that may be involved in collusions or otherwise suspicious activities. Entities thus listed can be blocked in real time to eliminate or otherwise minimize bad traffic and improve traffic quality, providing an accurate TQ prediction.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A system, comprising:
   a modeling module embodied on a non-transitory computer readable medium for processing historical click data received from a client and generating one or more models, wherein each of the one or more models formulates potential collusion among entities in the historical click data as a graph partitioning problem, a vector space clustering problem, or a combination thereof;
   a toolkit comprising a plurality of heuristics for solving problems formulated by the modeling module, the problems including graph partitioning problems, vector space clustering problems, or a combination thereof, wherein the plurality of heuristics comprises:
      a first set of heuristics for solving graph partitioning problems formulated by the modeling module to generate subgraphs of connected nodes representing entities involved in suspicious activities;
      a second set of heuristics for solving vector space clustering problems formulated by the modeling module to generate high dimensional vector space clusters or groups of entities having similar patterns over a period of time; and
      a third set of heuristics for transforming graphs into vector spaces and performing clustering associated therewith; and
   a post processor comprising a set of rules for filtering results from the toolkit, extracting entities of interest, and placing the entities of interest on global block lists, wherein filtering the results comprises eliminating subgraphs that do not meet a density requirement and removing known entities to eliminate or reduce false positives.

2. The system of claim 1, further comprising:
   a job scheduler for assigning jobs, each corresponding to one of the one or more models.

3. The system of claim 2, wherein the plurality of heuristics is performed by a plurality of processors in a distributed computing environment having a plurality of main memories.

4. The system of claim 1, wherein the global block lists comprise Internet Protocol (IP) addresses to be blocked from entering a plurality of client networks.

5. The system of claim 1, further comprising:
   a real time click scoring engine for scoring incoming real time click data utilizing the global block lists.

6. The system of claim 1, wherein the historical click data comprises a plurality of clicks generated over a period of time and information associated with the plurality of clicks, and wherein the information comprises visitor Internet Protocol (IP) address information, date and time information, publisher information, referrer information, user-agent information, searched keywords, and cookie.

7. A method, comprising:
   at a server computer in a distributed computing environment, receiving historical click data from a client computer connected to the distributed computing environment over a network;
   the server computer processing the historical click data and generating one or more models, wherein each of the one or more models formulates potential collusion among entities in the historical click data as a graph partitioning problem, a vector space clustering problem, or a combination thereof, and wherein a modeling module performs the formulating;
   the server computer applying a plurality of heuristics to solve problems formulated by the modeling module, the problems including graph partitioning problems, vector space clustering problems, or a combination thereof, wherein the plurality of heuristics comprises:
      a first set of heuristics for solving graph partitioning problems formulated by the modeling module to generate subgraphs of connected nodes representing entities involved in suspicious activities;
      a second set of heuristics for solving vector space clustering problems formulated by the modeling module to generate high dimensional vector space clusters or groups of entities having similar patterns over a period of time; and
      a third set of heuristics for transforming graphs into vector spaces and performing clustering associated therewith; and
   the server computer post processing results from the applying step, wherein the post processing comprises:
      eliminating subgraphs that do not meet a density requirement;
      removing known entities to eliminate or reduce false positives;
      extracting entities of interest from high density subgraphs and high dimensional vector space clusters or groups; and
      placing the entities of interest on global block lists.

8. The method according to claim 7, further comprising:
   updating the global block lists dynamically or per a time interval.

9. The method according to claim 8, wherein the global block lists are updated daily.

10. The method according to claim 7, further comprising:
    utilizing the global block lists to score click data in real time.

11. The method according to claim 7, further comprising:
    blocking the entities of interest on the global block lists from entering a plurality of client networks.

12. The method according to claim 11, wherein the global block lists comprise Internet Protocol (IP) addresses of the entities of interest.

13. The method according to claim 7, further comprising:
    distributing a plurality of jobs, wherein each of the jobs corresponds to one of the one or more models.

14. A computer program product comprising at least one non-transitory computer readable medium storing computer instructions translatable by at least one processor to implement:
    a modeling module for processing historical click data received from a client and generating one or more models, wherein each of the one or more models formulates potential collusion among entities in the historical click data as a graph partitioning problem, a vector space clustering problem, or a combination thereof;
    a toolkit comprising a plurality of heuristics for solving problems formulated by the modeling module, the problems including graph partitioning problems, vector space clustering problems, or a combination thereof, wherein the plurality of heuristics comprises:
       a first set of heuristics for solving graph partitioning problems formulated by the modeling module to generate subgraphs of connected nodes representing entities involved in suspicious activities;

a second set of heuristics for solving vector space clustering problems formulated by the modeling module to generate high dimensional vector space clusters or groups of entities having similar patterns over a period of time; and a third set of heuristics for transforming graphs into vector spaces and performing clustering associated therewith; and a post processor comprising a set of rules for filtering results from the toolkit, extracting entities of interest, and placing the entities of interest on global block lists, wherein filtering the results comprises eliminating subgraphs that do not meet a density requirement and removing known entities to eliminate or reduce false positives.

15. The computer program product of claim 14, wherein the computer instructions are further translatable by the at least one processor to implement a job scheduler for assigning jobs, each corresponding to one of the one or more models.

16. The computer program product of claim 14, wherein the computer instructions are further translatable by the at least one processor to perform:
updating the global block lists dynamically or per a time interval.

17. The computer program product of claim 14, wherein the global block lists are updated daily.

18. The computer program product of claim 14, wherein the computer instructions are further translatable by the at least one processor to perform:
utilizing the global block lists to score click data in real time.

19. The computer program product of claim 14, wherein the computer instructions are further translatable by the at least one processor to perform:
blocking the entities of interest on the global block lists from entering a plurality of client networks.

20. The computer program product of claim 14, wherein the global block lists comprise Internet Protocol (IP) addresses of the entities of interest.

* * * * *